(12) United States Patent
Chang

(10) Patent No.: US 11,467,989 B2
(45) Date of Patent: Oct. 11, 2022

(54) SERIAL TRANSMISSION SYSTEM AND SERIAL TRANSMISSION METHOD

(71) Applicant: Realtek Semiconductor Corporation, Hsinchu (TW)

(72) Inventor: Chun-Chu Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/243,950

(22) Filed: Apr. 29, 2021

(65) Prior Publication Data

US 2022/0138124 A1  May 5, 2022

(30) Foreign Application Priority Data

Nov. 4, 2020  (TW) .................................. 109138476

(51) Int. Cl.
  *G06F 13/16* (2006.01)
  *G06F 13/42* (2006.01)
  *G06F 13/362* (2006.01)

(52) U.S. Cl.
  CPC ...... *G06F 13/1668* (2013.01); *G06F 13/4282* (2013.01)

(58) Field of Classification Search
  CPC .................................. G06F 13/42; H04H 20/71
  See application file for complete search history.

(56) References Cited

U.S. PATENT DOCUMENTS

| | | | |
|---|---|---|---|
| 2009/0222705 A1* | 9/2009 | Hekstra-Nowacka | G06F 15/17 714/748 |
| 2011/0164694 A1* | 7/2011 | Yamasaki | H04W 4/18 375/259 |
| 2012/0147804 A1* | 6/2012 | Hedayat | H04W 74/0816 370/312 |
| 2014/0286256 A1* | 9/2014 | Chowdhury | H04L 47/14 370/328 |
| 2014/0295760 A1* | 10/2014 | Park | H04W 84/18 455/41.2 |

* cited by examiner

*Primary Examiner* — Getente A Yimer
(74) *Attorney, Agent, or Firm* — Locke Lord LLP; Tim Tingkang Xia, Esq.

(57) ABSTRACT

A serial transmission system includes a first storage circuit, a second storage circuit, a control circuit, and a serial processing circuit. The first storage circuit is configured to store data-to-be-transmitted of a plurality of users. The second storage circuit is coupled to the first storage circuit. The control circuit is configured to control the second storage circuit to receive the data-to-be-transmitted from the first storage circuit. The serial processing circuit is configured to receive the data-to-be-transmitted from the second storage circuit in series, and output a plurality of multi-user packets.

13 Claims, 6 Drawing Sheets

SERIAL TRANSMISSION SYSTEM AND SERIAL TRANSMISSION METHOD

RELATED APPLICATIONS

This application claims priority to Taiwanese Application Serial Number 109138476, filed Nov. 4, 2020, which is herein incorporated by reference.

BACKGROUND

Technical Field

The present disclosure relates to data transmission technology. More particularly, the present disclosure relates to a serial transmission system and a serial transmission method for multiple users.

Description of Related Art

With developments of networks technology, many applications can support data transmission functions for multiple users. In some related arts, data is transmitted in parallel. However, this leads to higher hardware cost and needs a storage circuit with a larger storage capacity. In addition, this makes memories inefficient.

SUMMARY

Some aspects of the present disclosure are to provide a serial transmission system. The serial transmission system includes a first storage circuit, a second storage circuit, a control circuit, and a serial processing circuit. The first storage circuit is configured to store data-to-be-transmitted of a plurality of users. The second storage circuit is coupled to the first storage circuit. The control circuit is configured to control the second storage circuit to receive the data-to-be-transmitted from the first storage circuit. The serial processing circuit is configured to receive the data-to-be-transmitted from the second storage circuit in series, and output a plurality of multi-user packets.

Some aspects of the present disclosure are to provide a serial transmission method. The serial transmission method includes following operations: storing, by a first storage circuit, data-to-be-transmitted of a plurality of users; controlling, by a control circuit, a second storage circuit to receive the data-to-be-transmitted from the first storage circuit; and receiving, by a serial processing circuit, the data-to-be-transmitted from the second storage circuit in series, and outputting, by the serial processing circuit, a plurality of multi-user packets.

Based on the descriptions above, the serial transmission system and the serial transmission method in the present disclosure can transmit data in series. Thus, it can reduce hardware cost, reduce the required storage capacity of the storage circuit, and make the system operate more efficiently.

BRIEF DESCRIPTION OF THE DRAWINGS

The disclosure can be more fully understood by reading the following detailed description of the embodiment, with reference made to the accompanying drawings as follows.

DETAILED DESCRIPTION

The following embodiments are disclosed with accompanying diagrams for detailed description. For better understanding, many details of practice are explained in the following descriptions. However, it should be understood that these details of practice do not intend to limit the present disclosure. That is, these details of practice are not necessary in part of embodiments of the present embodiments.

In the present disclosure, "connected" or "coupled" may refer to "electrically connected" or "electrically coupled." "Connected" or "coupled" may also refer to operations or actions between two or more elements.

Figure 1:
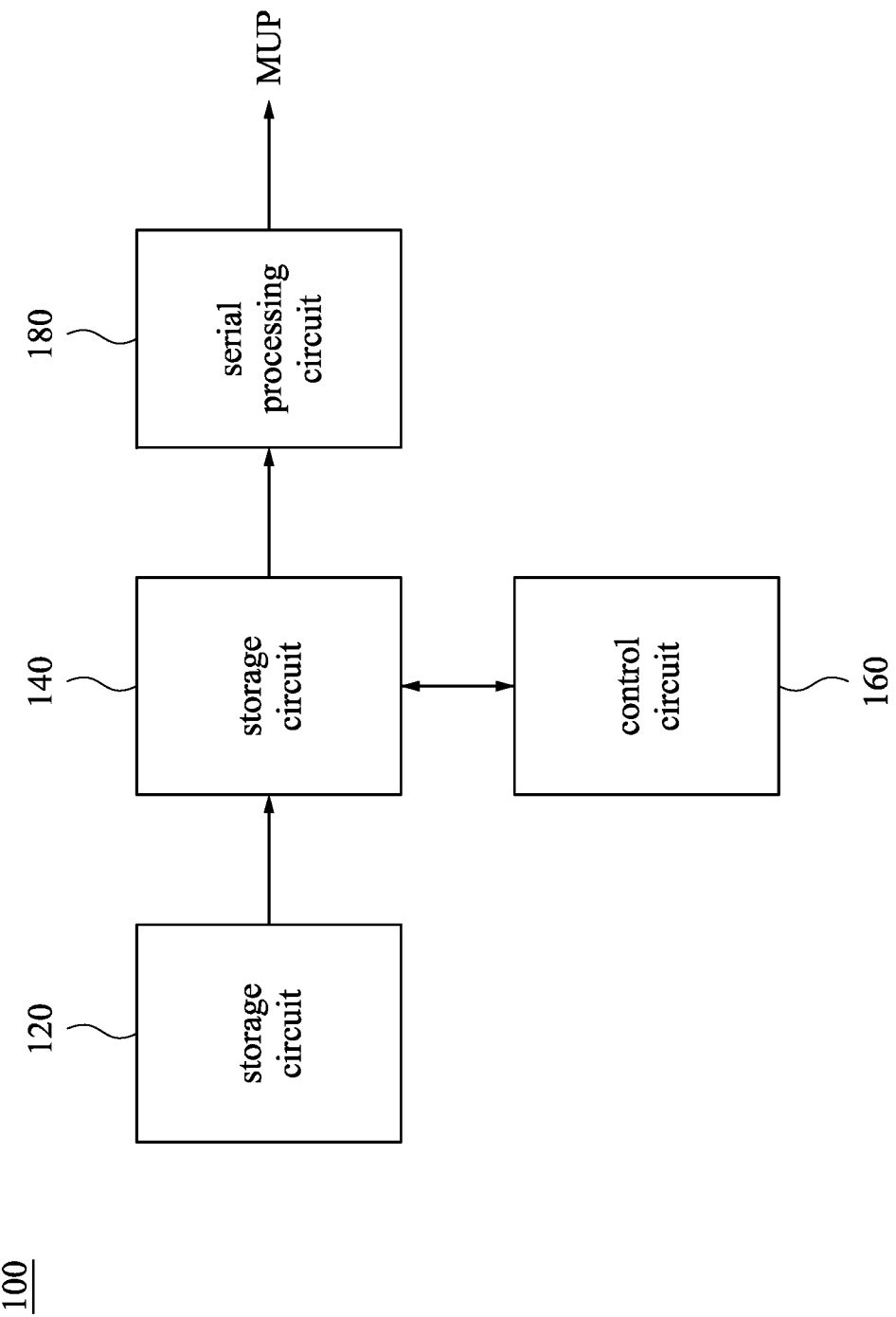
FIG. 1 is a schematic diagram illustrating a serial transmission system according to some embodiments of the present disclosure.

Reference is made to FIG. 1. FIG. 1 is a schematic diagram illustrating a serial transmission system 100 according to some embodiments of the present disclosure. In some embodiments, the serial transmission system 100 may be applied to transmissions for multiple users. For example, the serial transmission system 100 can transmit data of different users in a wireless network environment.

As illustrated in FIG. 1, the serial transmission system 100 includes a storage circuit 120, a storage circuit 140, a control circuit 160, and a serial processing circuit 180. The storage circuit 140 is coupled to the storage circuit 120. The control circuit 160 is coupled to the storage circuit 140. The serial processing circuit 180 is coupled to the storage circuit 140.

In some embodiments, the storage circuit 120 and the storage circuit 140 may be implemented by memories or other elements/circuits which have storage functions. The control circuit 160 may be implemented by a micro-controller or other elements/circuits which have control functions. The serial processing circuit 180 may be implemented by a micro-processor or other elements/circuits which have processing functions.

In operation, the storage circuit 120 may be a data pool and stores data-to-be-transmitted of multiple users. The storage circuit 140 may be a buffer and temporarily stores the data-to-be-transmitted from the storage circuit 120. The control circuit 160 is configured to control the storage circuit 140 to receive the data-to-be-transmitted in the storage circuit 120. Then, the serial processing circuit 180 receives the data-to-be-transmitted in the storage circuit 140 in series, and outputs multi-user packets MUP.

In some embodiments, the multi-user packets MUP satisfy IEEE 802.11 specification and the serial processing circuit 180 receives the data-to-be-transmitted from the storage circuit 140 based on the OFDM symbol-based method but the present disclosure is not limited thereto.

In some related arts, the processing circuit receives data in parallel. For example, if a system supports M users to transmit data in parallel, the system needs M data transmission paths, and the storage capacity of the storage circuit needs to be larger to store the data of the M users. Thus, this leads to higher hardware cost and needs a storage circuit with a larger storage capacity. In addition, this makes memories inefficient.

Compared to the related arts mentioned above, in the serial transmission system 100 of the present disclosure, the serial processing circuit 180 receives the data-to-be-transmitted in the storage circuit 140 in series. Accordingly, it does not need to dispose multiple data transmission paths and can reduce the hardware cost. In addition, it can reduce the storage capacity of the storage circuit 140 and the serial transmission system 100 can operate more efficiently.

The details about how the control circuit 140 controls the data transmission and how the serial processing circuit 180 receives the data-to-be-transmitted in the storage circuit 140 in series are described in following paragraphs.

Figure 2:
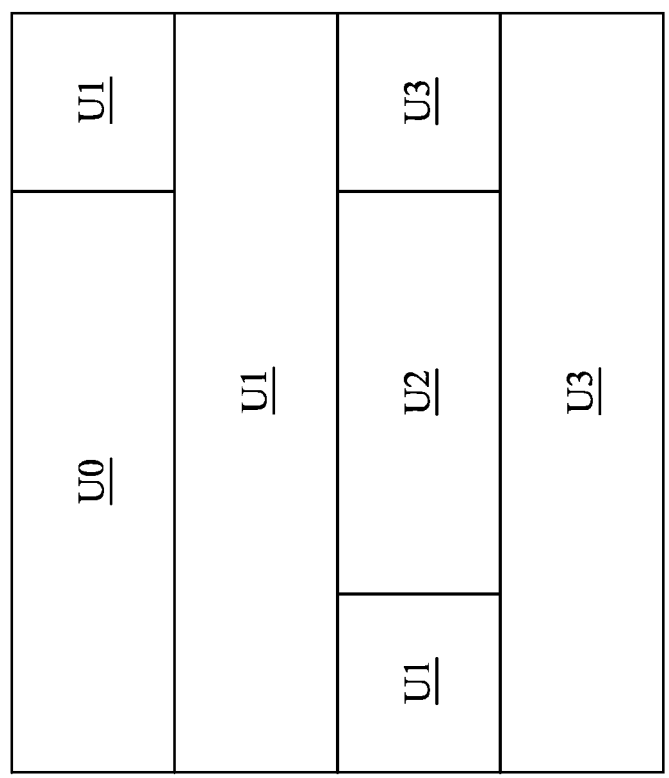
FIG. 2 is a schematic diagram illustrating a configuration of a storage circuit according to some embodiments of the present disclosure.

Reference is made to FIG. 2. FIG. 2 is a schematic diagram illustrating a configuration of the storage circuit 140 according to some embodiments of the present disclosure. As described above, the serial transmission system 100 may be applied in a wireless network environment. In some embodiments, a storage capacity of the storage circuit 140 is corresponding to a maximum transmission rate of the wireless network environment.

The control circuit 160 in FIG. 1 can assign a ratio of storage capacities of the users in the storage circuit 140. As illustration in FIG. 2, the storage circuit 140 is divided into a storage space for a user U0, a storage space for a user U1, a storage space for a user U2, and a storage space for a user U3. A ratio of the storage space for the user U0, the storage space for the user U1, the storage space for the user U2, and the storage space for the user U3 is 3:6:2:5.

In some embodiments, the control circuit 160 determines the ratio and the storage capacities of the users according to a resource unit value and a user spatial stream value of each of the users, as formula (1) and formula (2) below $$AL(m)=TOT \times {(UF[m])}/{(UF[0]+UF[1] \ldots UF[M-1])} \quad (1)$$

$$UF[m]=RU[m] \times NSS[m] \quad (2)$$

in which it is assumed that there are M users, AL(m) is a storage capacity of a corresponding user, TOT is a total storage capacity of the storage circuit 140, (UF[0]+UF[1] . . . UF[M−1]) is a sum of storage capacity weighting values of the users, UF[m] is a storage capacity weighting value of the corresponding user, and ${(UF[m])}/{UF[0]+UF[1] \ldots UF[M-1]}$ is a ratio of a storage capacity of the corresponding user to the total storage capacity. RU[m] is the resource unit value of the corresponding user, and NSS[m] is the user spatial stream value of the corresponding user. In other words, the resource unit value of a user and the user spatial stream value of a user are used to determine the storage capacity weighting value of the user.

In some other embodiments, the control circuit 160 determines the ratio and the storage capacities of the users according to a data transmission rate of each of the users, as formula (3) below:

$$AL(m)=TOT \times {UF[m])}/{[0]+UF[1] \ldots UF[1]UF[M-1])} \quad (3)$$

$$UF[m]=DR[m] \quad (4)$$

in which it is assumed that there are M users, AL(m) is a storage capacity of a corresponding user, TOT is a total storage capacity of the storage circuit 140, (UF[0]+UF[1] . . . UF[M−1]) is a sum of storage capacity weighting values of the users, UF[m] is a storage capacity weighting value of the corresponding user, ${(UF[m])}/{UF[0]+UF[1] \ldots UF[M-1]}$ is a ratio of a storage capacity of the corresponding user to the total storage capacity, and DR[m] is the data transmission rate of the corresponding user. In other words, the data transmission rate of a user is used to determine the storage capacity weighting value of the user.

Figure 3:
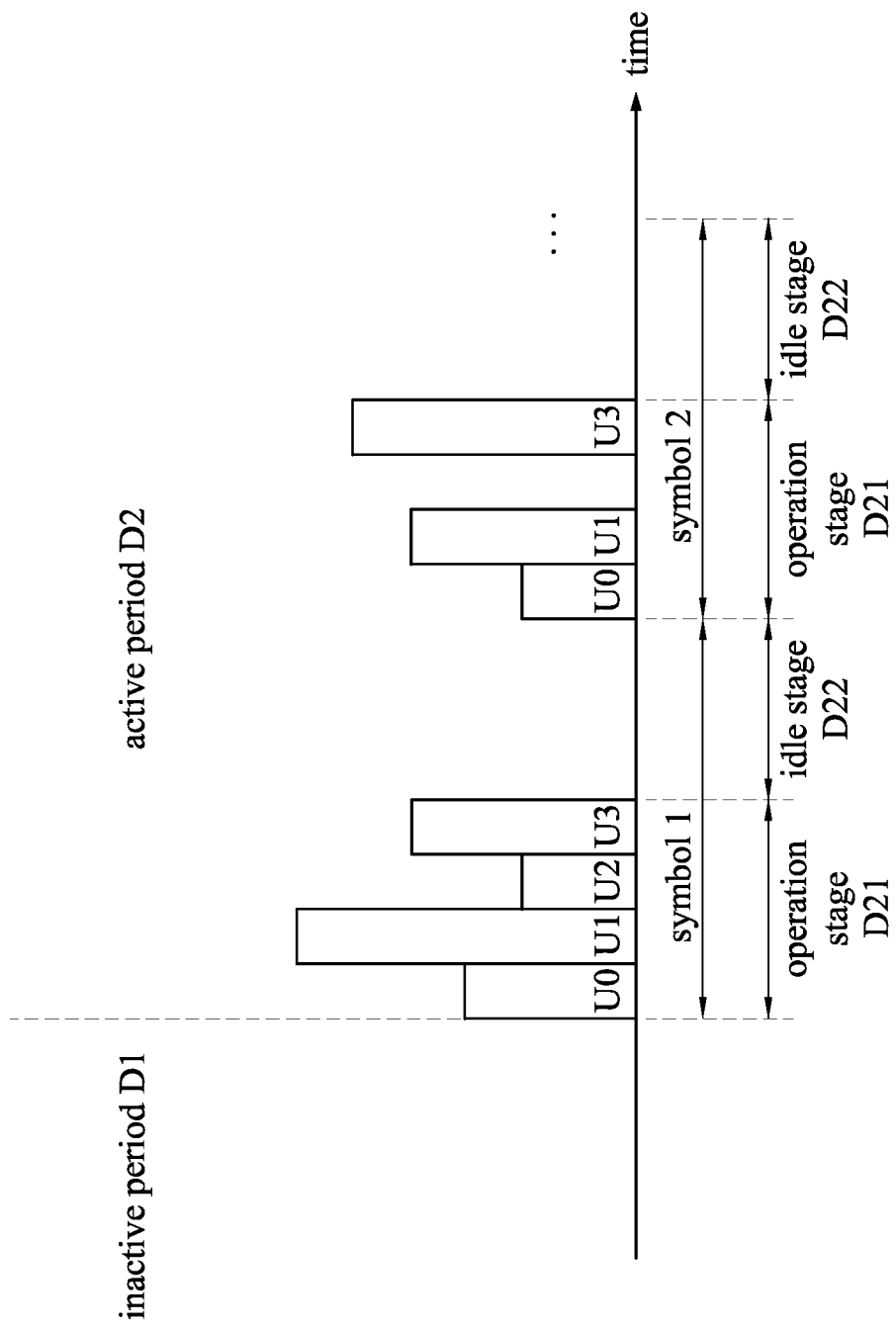
FIG. 3 is a timing diagram illustrating a series operation according to some embodiments of the present disclosure.

FIG. 3 is a timing diagram illustrating a series operation according to some embodiments of the present disclosure. FIG. 3 takes the orthogonal frequency division multiplexing (OFDM) as an example. The details about how to switch the users and the timing are described in following paragraphs with respect to FIG. 1 and FIG. 3.

In some embodiments, if the serial processing circuit 180 is in an inactive period D1 or the serial processing circuit 180 is in an idle stage D22 of an active period D2, the control circuit 160 controls the storage circuit 140 to receive the data-to-be-transmitted of the users U0-U3 in the storage circuit 120. If the amount of the data transmitted to the storage circuit 140 of each of the user U0-U3 satisfy to the corresponding transmission rate (for example, $N_{CBPS}$), it indicates that there is enough data-to-be-transmitted in the storage circuit 140 for the serial processing circuit 180 to receive in the operation stage D2. Then, the control circuit 160 controls the users U0-U3 in a round-robin way. For example, the control circuit 160 controls the storage circuit 140 to receive the data-to-be-transmitted of the user U0 in the storage circuit 120, until a complete protocol data unit (for example, MAC Protocol Data Unit (MPDU) of the user U0 is stored in the storage circuit 140, the storage capacity for the user U0 in the storage circuit 140 is full, or there is no data-to-be-transmitted of the user U0 in the storage circuit 120. Then, the control circuit 160 switches to control another user U1, to control the storage circuit 140 to receive the data-to-be-transmitted of the user U1 in the storage circuit 120, until a complete protocol data unit of the user U1 is stored in the storage circuit 140, the storage capacity for the user U1 in the storage circuit 140 is full, or there is no data-to-be-transmitted of the user U1 in the storage circuit 120. The principle is applied to other users U2-U3.

In some embodiments, if the serial processing circuit 180 is in an operation stage D21 and both the control circuit 160 and the serial processing circuit 180 operate on user U0, it indicates that the control circuit 160 controls the storage circuit 140 to receive the data-to-be-transmitted of the user U0 in the storage circuit 120 and the serial processing circuit 180 receives the data-to-be-transmitted of the user U0 in the storage circuit 140. In this situation, if the amount of the data transmitted to the storage circuit 140 of the user U0 is greater than a minimum threshold value (minimum threshold value is less than the storage capacity for the user U0 in the storage circuit 140), the control circuit 160 controls the storage circuit 140 to continue to receive the data-to-be-transmitted of the user U0 in the storage circuit 120, until the amount of the data transmitted to the storage circuit 140 of the user U0 satisfies the transmission rate of the user U0. Then, the control circuit 160 switches to control another user U1, to control the storage circuit 140 to receive the data-to-be-transmitted of the user U1 in the storage circuit 120, until the amount of the data transmitted to the storage circuit 140 of the user U1 satisfies the transmission rate of the user U1. The principle is applied to other users U2-U3. In some embodiments, the aforementioned minimum threshold value can be set by a register.

Figure 4:
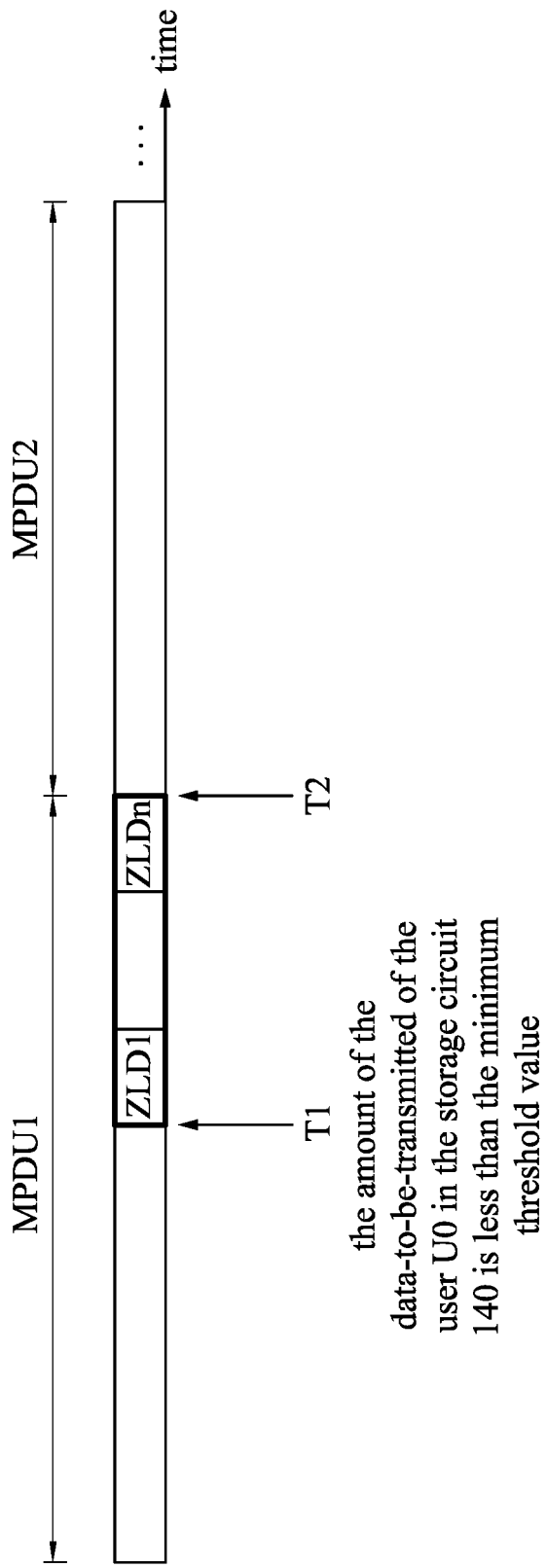
FIG. 4 is a schematic diagram illustrating an error processing process according to some embodiments of the present disclosure.
Figure 5:
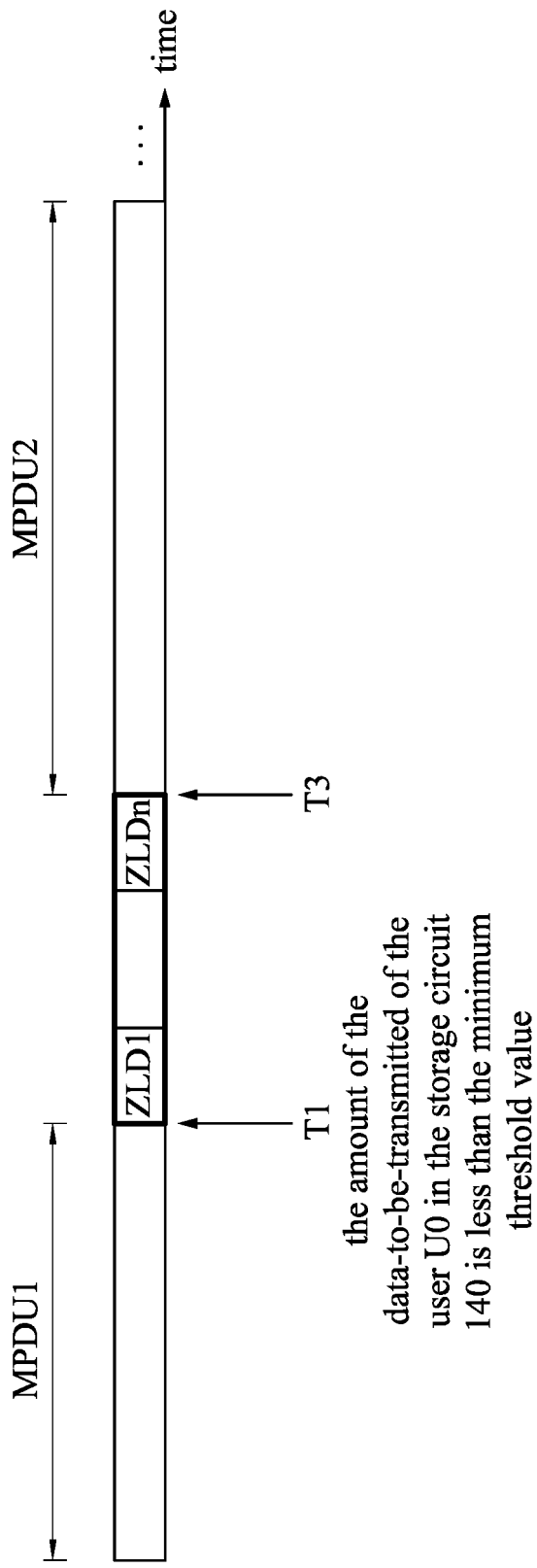
FIG. 5 is a schematic diagram illustrating an error processing process according to some embodiments of the present disclosure.

However, if both of the control circuit 160 and the serial processing circuit 180 operate on the user U0 and the amount of the data-to-be-transmitted of the user U0 in the storage circuit 140 is less than the minimum threshold value, the control circuit 160 can perform an error processing process. References are made to FIG. 4 and FIG. 5. FIG. 4 and FIG. 5 are a schematic diagram illustrating an error processing process according to some embodiments of the present disclosure. For example, the control circuit 160 can add zero-length delimiters ZLD1-ZLDn to the data-to-be-transmitted of the user U0 at an adding time point T1.

As illustrated in FIG. 4, if the adding time point T1 of adding the zero-length delimiters ZLD1-ZLDn is in a transmission time interval of a protocol data unit MPDU1, the zero-length delimiters ZLD1-ZLDn is added between the adding time point T1 and an ending time point T2 of the protocol data unit MPDU1. Accordingly, the data-to-be-transmitted can be transmitted successfully.

As illustrated in FIG. 5, if the protocol data unit MPDU1 is completely received by the serial processing circuit 180 and the adding time point T1 of adding the zero-length delimiters ZLD1-ZLDn is after a transmission time interval of the protocol data unit MPDU1, the zero-length delimiters ZLD1-ZLDn is added between the adding time point T1 and a starting time point T3 of a next protocol data unit MPDU2. Accordingly, the data-to-be-transmitted can be transmitted successfully.

In some embodiments, if the control circuit 160 and the serial processing circuit 180 operate on different users (for example, the control circuit 160 operates on the user U0 and the serial processing circuit 180 operates on the user U1) and the data-to-be-transmitted of the user U0 in the storage circuit 140 is less than the minimum threshold value, the control circuit 160 can control the storage circuit 140 to continue to receive the data-to-be-transmitted of the user U0 in the storage circuit 120, until the data-to-be-transmitted of the user U0 in the storage circuit 140 is equal to the minimum threshold value. Thus, it can ensure that next time there is enough data-to-be-transmitted of user U0 in the storage circuit 140 for the serial processing circuit 180 to receive. Then, the control circuit 160 switches to operate on the user U1. The principle is applied to other users U1-U3.

Based on the descriptions above, since only data of one user is transmitted after each switch, the "serial transmission" can be achieved. Accordingly, it can reduce hardware cost, reduce the storage capacity the storage circuit 140 requires, and make the serial transmission system 100 operate more efficiently. In addition, in some embodiments, the control circuit 160 can perform the error processing process, such that the data can be transmitted successfully.

Figure 6:
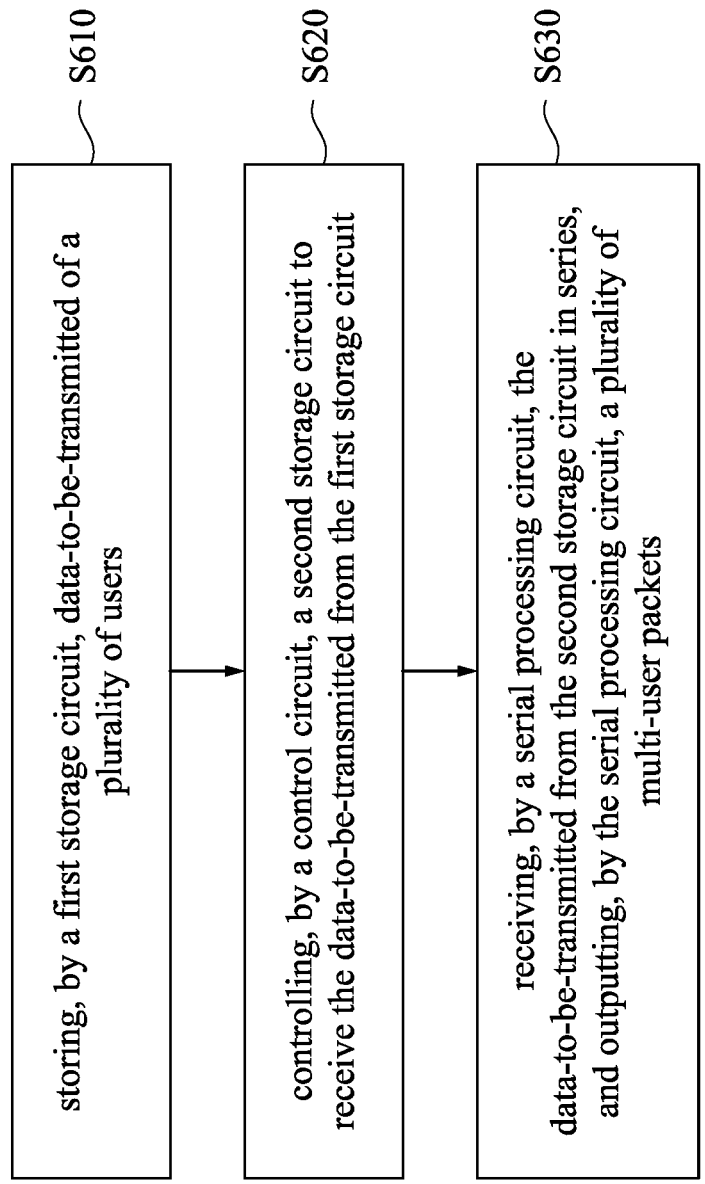
FIG. 6 is a flow diagram illustrating a serial transmission method according to some embodiments of the present disclosure.

Reference is made to FIG. 6. FIG. 6 is a flow diagram illustrating a serial transmission method 600 according to some embodiments of the present disclosure. The serial transmission method 600 includes operations S610, S620, and S630.

In operation S610, the storage circuit 120 stores the data-to-be-transmitted of the users. In some embodiments, the storage circuit 120 is the data pool, to store the data-to-be-transmitted of the users.

In operation S620, the control circuit 160 controls the storage circuit 140 to receive the data-to-be-transmitted in the storage circuit 120. In some embodiments, the storage capacity of the storage circuit 140 is corresponding to the maximum transmission rate of the wireless network environment.

In operation S630, the serial processing circuit 180 receives the data-to-be-transmitted in the storage circuit 140 in series, and outputs the multi-user packets MUP. In some embodiments, the serial processing circuit 180 receives the data-to-be-transmitted from the storage circuit 140 by using the OFDM symbol-based method but the present disclosure is not limited thereto.

Based on the descriptions above, the serial transmission system and the serial transmission method in the present disclosure can transmit data in series. Thus, it can reduce hardware cost, reduce the required storage capacity of the storage circuit, and make the system operate more efficiently.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A serial transmission system, comprising:
a first storage circuit configured to store data-to-be-transmitted of a plurality of users;
a second storage circuit coupled to the first storage circuit;
a control circuit configured to control the second storage circuit to receive the data-to-be-transmitted from the first storage circuit; and
a serial processing circuit configured to receive the data-to-be-transmitted from the second storage circuit in series, and output a plurality of multi-user packets,
wherein the control circuit is configured to assign a ratio of storage capacities in the second storage circuit for the users according to a resource unit value and a user spatial stream value of each of the users or according to a data transmission rate of each of the users.

2. The serial transmission system of claim 1, wherein a storage capacity of the second storage circuit is corresponding to a maximum transmission rate of a wireless network environment.

3. The serial transmission system of claim 1, wherein the control circuit is configured to switch the users to control the second storage circuit to receive the data-to-be-transmitted of a current user in the first storage circuit.

4. The serial transmission system of claim 3, wherein if the serial processing circuit is in an inactive period or an idle stage and an amount of data transmitted to the second storage circuit of each of the users satisfies a corresponding transmission rate, the control circuit controls the users by turns until a complete protocol data unit of the current user has been stored in the second storage circuit, a storage space corresponding to the current user in the second storage circuit is full, or there is no data-to-be-transmitted in the first storage circuit, and then the control circuit controls another user.

5. The serial transmission system of claim 3, wherein if the serial processing circuit is in an operation stage and both of the control circuit and the serial processing circuit operate on the current user, and if the data-to-be-transmitted of the current user in the second storage circuit is greater than a minimum threshold value, the control circuit controls the second storage circuit to receive the data-to-be-transmitted of the current user in the first storage circuit until an amount for a corresponding transmission rate is satisfied, and then the control circuit controls another user.

6. The serial transmission system of claim 1, wherein if both of the control circuit and the serial processing circuit operate on a current user and the data-to-be-transmitted of the current user in the second storage circuit is less than a minimum threshold value, the control circuit performs an error processing process.

7. The serial transmission system of claim 6, wherein the control circuit at least adds a zero-length delimiter to the data-to-be-transmitted of the current user in the second storage circuit at an adding time point.

8. The serial transmission system of claim 7, wherein if the adding time point is in a transmission time interval of a protocol data unit of the data-to-be-transmitted of the current user, the zero-length delimiter is added between the adding time point and an ending time point of the protocol data unit.

9. The serial transmission system of claim 7, wherein if the adding time point is after a transmission time interval of a protocol data unit of the data-to-be-transmitted of the current user, the zero-length delimiter is added between the adding time point and a starting time point of a next protocol data unit.

10. The serial transmission system of claim 1, wherein if the control circuit and the serial processing circuit operate on a first user and a second user of the users respectively and the data-to-be-transmitted of a current user in the second storage circuit is less than a minimum threshold value, the control circuit controls the second storage circuit to receive the data-to-be-transmitted of the current user in the first storage circuit until the data-to-be-transmitted of the current user in the second storage circuit is equal to the minimum threshold value, and then the control circuit operates on the second user.

11. A serial transmission method, comprising:
storing, by a first storage circuit, data-to-be-transmitted of a plurality of users;
assigning, by a control circuit, a ratio of storage capacities in a second storage circuit for the users according to a resource unit value and a user spatial stream value of each of the users or according to a data transmission rate of each of the users;
controlling, by the control circuit, the second storage circuit to receive the data-to-be-transmitted from the first storage circuit; and
receiving, by a serial processing circuit, the data-to-be-transmitted from the second storage circuit in series, and outputting, by the serial processing circuit, a plurality of multi-user packets.

12. The serial transmission method of claim 11, further comprising:
switching, by the control circuit, the users to control the second storage circuit to receive the data-to-be-transmitted of a current user in the first storage circuit.

13. The serial transmission method of claim 11, further comprising:
adding, by the control circuit, at least a zero-length delimiter to the data-to-be-transmitted of a current user in the second storage circuit at an adding time point if both of the control circuit and the serial processing circuit operate on the current user and the data-to-be-transmitted of the current user in the second storage circuit is less than a minimum threshold value.

* * * * *